United States Patent [19]
Schultz

[11] Patent Number: 5,918,778
[45] Date of Patent: Jul. 6, 1999

[54] PUMP AND PUMP SECURING DEVICE WHICH MAINTAINS CONSISTENT DOSAGE ACCURACY, AND METHOD OF SECURING A PUMP TO A CONTAINER

[75] Inventor: Robert S. Schultz, Old Greenwich, Conn.

[73] Assignee: Emson, Inc., Bridgeport, Conn.

[21] Appl. No.: 08/994,175

[22] Filed: Dec. 19, 1997

[51] Int. Cl.$^6$ .............................. B65D 88/54; G01F 11/36; B67D 5/40
[52] U.S. Cl. .................................... 222/321.7; 222/321.1; 222/321.2; 222/321.9; 222/385
[58] Field of Search .............................. 222/321.1, 321.2, 222/321.7, 321.9, 385

[56] References Cited

U.S. PATENT DOCUMENTS

| | | |
|---|---|---|
| 4,029,261 | 6/1977 | Olegnowicz . |
| 4,122,982 | 10/1978 | Giuffredi . |
| 4,274,560 | 6/1981 | Cater . |
| 4,389,003 | 6/1983 | Meshberg . |
| 4,606,479 | 8/1986 | Van Brocklin . |
| 4,735,347 | 4/1988 | Schultz et al. . |
| 5,020,696 | 6/1991 | Cater . |
| 5,038,965 | 8/1991 | Cater . |
| 5,092,495 | 3/1992 | Andre . |
| 5,108,013 | 4/1992 | VanBrocklin . |
| 5,147,073 | 9/1992 | Cater . |
| 5,163,588 | 11/1992 | Cater . |
| 5,190,192 | 3/1993 | Lina et al. . |
| 5,277,559 | 1/1994 | Schultz . |
| 5,284,276 | 2/1994 | Cater . |
| 5,299,703 | 4/1994 | Cater ..................................... 222/321.7 |
| 5,638,996 | 6/1997 | Montaner et al. . |
| 5,816,453 | 10/1998 | Spencer et al. ...................... 222/321.7 |

FOREIGN PATENT DOCUMENTS

| | | |
|---|---|---|
| 0 004 127 | 9/1979 | European Pat. Off. . |
| 0 330 530 | 8/1989 | European Pat. Off. . |
| 0 346 167 | 12/1989 | European Pat. Off. . |
| 2 344 339 | 11/1977 | France . |
| 319466 | 5/1992 | Japan . |

*Primary Examiner*—Andres Kashnikow
*Assistant Examiner*—Keats Quinalty
*Attorney, Agent, or Firm*—Kenyon & Kenyon

[57] ABSTRACT

A pump and pump securing device, which pump securing device includes, at its axially-outer end, an axially-outer step and a axially-inner step. These steps are used to interact with a radially-projecting flange on the pump, thereby allowing the pump to be securely snapped into the mounting cup without the need for crimping. The steps also control the position of the pump relative to the mounting cup. As a result, the steps prevent the pump from compressing gaskets in the assembly, thereby controlling variations in pump dosage resulting from gasket compression. The flange can include slots creating vent paths for venting air into the container during operation of the pump.

23 Claims, 2 Drawing Sheets

PUMP AND PUMP SECURING DEVICE WHICH MAINTAINS CONSISTENT DOSAGE ACCURACY, AND METHOD OF SECURING A PUMP TO A CONTAINER

BACKGROUND OF THE INVENTION

1. Field of the Invention

The present invention relates to a pump and a pump securing device for mounting a pump on a container, which ensure that the pump will operate with consistent dosage accuracy. More specifically, the present invention relates to a low-profile pump and a mounting cup or ferrule which is securely mounted to the pump without crimping, which prevents variations in the dosage size of the pump, and which allows venting of the container.

2. Description of the Prior Art

In the art of container-mounted pumps, it is known to crimp the pump on the neck of the container using a mounting cup or ferrule. Conventionally, it has been required, during a sub-assembly step, to crimp the mounting cup or ferrule to the pump body, so that the resulting assembly can be mounted as a unit to a container neck. In order to ensure proper sealing of the pump on the container, thereby to minimize leakage, it is conventional to use a resilient gasket or gaskets which interact with the container neck and/or the pump housing. A disadvantage of such conventional arrangements is that when the pump is secured to the container by conventional mounting techniques—e.g., crimping—the lower (i.e., axially inner) gasket is often compressed during the crimping process, and the amount of lower gasket compression cannot easily be controlled. As a result, variations in the amount of compression of the lower gasket will cause variations in the stroke length of the pump piston, due to upward pressure on the pump housing caused by the crimped and compressed gasket. This upward pressure on the pump housing can cause reduction in the stroke length of the pump piston in two ways: first, by moving the pump housing upwardly, and second, by causing the upper portion of the pump housing to compress the outer edges of the upper (i.e., axially outer) gasket (also called the diaphragm) and thereby forcing down the central part of the upper gasket, reducing the stroke length of the pump piston. Dosage variations are therefore created during the process of crimping the pump and mounting cup to the container. Such dosage variations, in many uses of container-mounted pumps, are not acceptable.

SUMMARY OF INVENTION

The present invention is a pump and pump securing device which eliminate the problems with conventional pump securing techniques. The mounting cup of the present invention includes, at its axially-outer end, a radially-inwardly projecting axially-outer step and a radially-inwardly projecting axially-inner step. These steps are used to interact with a radially-projecting flange with axial slots on the pump housing, thereby allowing the pump to be securely snapped into the mounting cup without the need for crimping. The inner and outer steps also control the position of the pump relative to the mounting cup. As a result, the steps prevent the pump housing from moving up during crimping, preventing compressing of the upper gasket or diaphragm, and thereby preventing variations in pump dosage resulting from pump housing movements relative to the mounting cup or ferrule during crimping or variations caused by upper gasket or diaphragm compression. The slots also create vent paths for venting air into the container during operation of the pump.

In the method of the present invention, at least one upper gasket or diaphragm is inserted into the mounting cup or ferrule, preferably as the pump is snapped into the mounting cup or ferrule, by snapping the flange between the inner and outer steps. An actuator may then be attached to the pump piston stem. The completed assembly may thereafter be secured to the container by any known method, such a crimping, screwing, etc.

BRIEF DESCRIPTION OF THE DRAWINGS

Other objects and advantages of the invention will be apparent from the specification and claims, when considered in connection with the attached sheets of drawings, illustrating one form of the invention, wherein like characters represent like parts and in which:

DETAILED DESCRIPTION OF THE DRAWINGS

Figure 1:
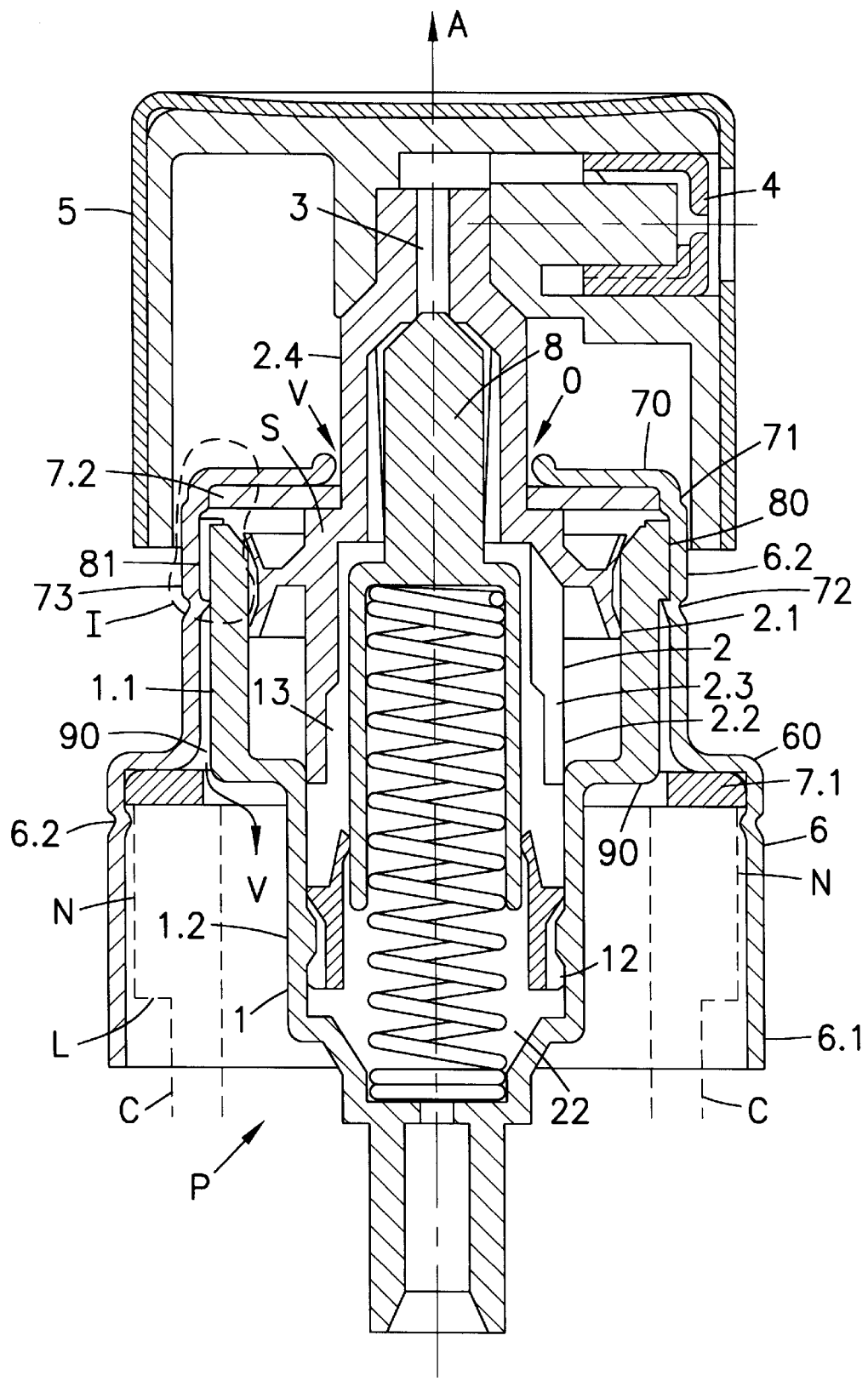
FIG. 1 is a cross-sectional view of a pump and mounting cup of the present invention.

FIG. 1 is a cross-sectional view of a pump P of an embodiment of the present invention. Pump P includes a housing 1, in which a piston 2 slides. The pump P housing 1 can include a larger diameter section 1.1 and a smaller diameter section 1.2. The pump P piston 2 can include a larger diameter section 2.1, mating with and sliding reciprocally in larger diameter section 1.1, and a smaller diameter section 2.2, mating with and sliding reciprocally in smaller diameter section 1.2. Smaller diameter section 2.2 includes at least one slot 2.3 to allow fluid in smaller diameter section 1.2 to flow into larger diameter section 1.1, and smaller diameter section 2.2 is preferably used to snap sliding seal 12 into place as the pump is being assembled. Piston 2 includes an outlet passage 3 on a pump stem 2.4 which leads to an atomizing nozzle 4. A sliding seal 12 seals the inlet end of a pump chamber 13 created within housing 1. The sliding seal 12 can be of the type described in, e.g., U.S. Pat. No. 5,277,559. A valve stem 8 and spring 22, as known in the art of precompression pumps, can control the delivery of pressurized liquid to the nozzle 4. Atomizing nozzle 4 is housed in an actuator assembly 5. The pump P can be mounted on a container or bottle C having a neck N, as described in more detail below.

The mounting cup or ferrule 6 of the present invention can be constructed of a stepped design, including a larger diameter, axially-inner (i.e., relative to pump axis A) section 6.1 and a smaller diameter, axially-outer section 6.2. Axially-inner section 6.1 can include a circumferential indent 62 near the transition area 60 between axially-outer 6.2 and axially-inner 6.1 sections. Indent 62 is useful for retaining a lower gasket 7.1 against transition area 60, and therefore for securely holding lower gasket 7.1 within mounting cup or ferrule 6. Lower gasket 7.1 is used to provide a seal against the upper end of neck N, to thereby prevent leakage of liquid in container C between mounting cup or ferrule 6 and neck N. As is known in the art, the lower end of axially-inner section 6.1 may be crimped or otherwise deformed to attach it to the lower surface L of a flange on neck N, or alternatively the lower end of axially-inner section 6.1 can include known securing structures—i.e., screw threads—for securing the mounting cup or ferrule 6 to the neck N.

Axially-outer section 6.2 may include an opening O to allow the pump stem 2.4 of piston 2 to project therethrough.

Axially-outer section 6.2 also includes radially-inwardly projecting, circumferential, axially-outer 71 and axially-inner 72 steps on its inner surface near the top 70. The steps 71, 72 may be formed by stamping or molding a circumferential ring 73 in the axially-outer section 6.2 of mounting cup or ferrule 6, or alternatively, stamping or molding two indents in the axially-outer section 6.2 of mounting cup or ferrule 6. Axially-outer step 71 is axially spaced from the top 70 of mounting cup or ferrule 6 a distance D (FIG. 2) which is equal to or slightly greater than the thickness t (FIG. 2) of an upper gasket or diaphragm 7.2. This spacing ensures that the pump P housing 1 cannot move up to compress upper gasket or diaphragm 7.2 —because of the interaction of flange 80 and step 71 —thereby preventing alteration of the dosage of the pump P resulting from upper gasket or diaphragm 7.2 compression.

Figure 2:
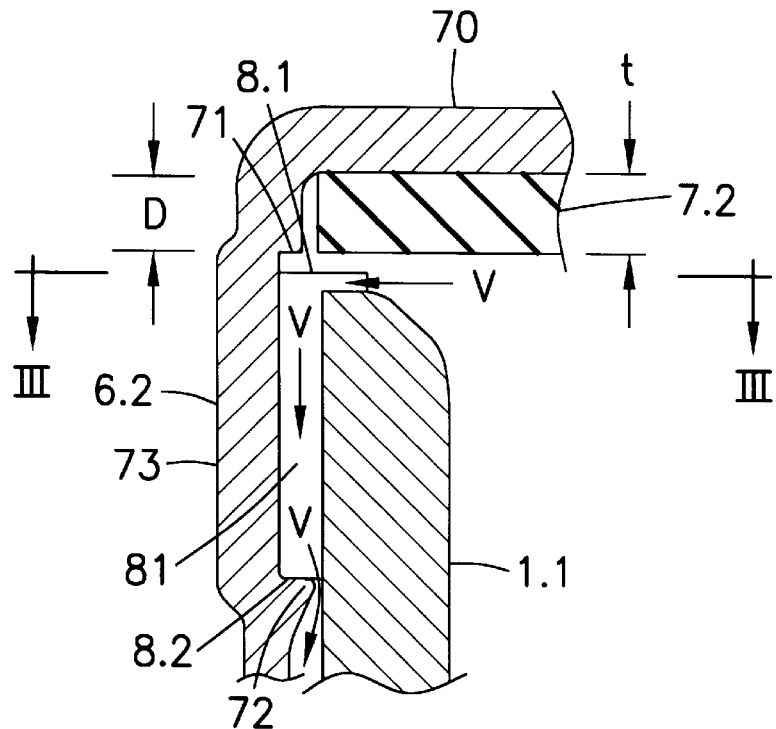
FIG. 2 is a detail, cross-sectional view of circled area I.
Figure 3:
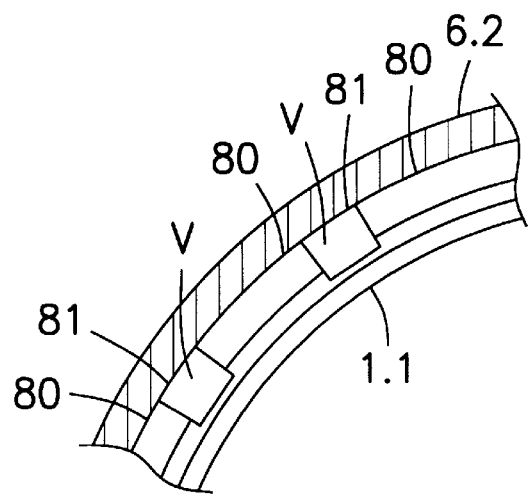
FIG. 3 is a detailed top view along line III—III of FIG. 2.

As shown particularly in the detail view of FIG. 2, the radially-outer surface of the axially-outer end of larger diameter section 1.1 includes at least one radial projection, which in the preferred embodiment is in the form of a flange 80 with axial slots 81. Flange 80 is axially sized so as to snap into the gap between the axially-outer 71 and axially-inner 72 steps, such that the axially-outer step 71 prevents upward movement of the housing 1 relative to the mounting cup or ferrule 6 by contact with the axially outer surface 8.1 of flange 80, and the axially-inner step 72 prevents downward movement of the housing 1 relative to the mounting cup or ferrule 6 by contact with the axially inner surface 8.2 of flange 80. As can be seen particularly in FIG. 3, flange 80, can include a series of slots 81 which are spaced circumferentially around the larger diameter section 1.1 and which slots 81 are sized to create vent paths V between the larger diameter section 1.1 and the mounting cup or ferrule 6. The larger diameter section 1.1 may include circumferentially-spaced notches 90 which assist in creating a vent path V between the larger diameter section 1.1 and lower gasket 7.1.

Assembly and operation of the device of the present invention will now be described. After forming mounting cup or ferrule 6 by suitable manufacturing methods, upper gasket or diaphragm 7.2 and lower gasket 7.1 may be placed, respectively, in axially-outer 6.2 and axially-inner 6.1 sections. Upper gasket or diaphragm 7.2 may be inserted at the same time as pump P is inserted into mounting cup or ferrule 6, by mounting upper gasket or diaphragm 7.2 on pump stem 2.4. At least lower gasket 7.1 may be held in place by snapping or forcing it between circumferential indent 62 and transition area 60, or may be held in place by friction, without the need for circumferential indent 62. Thereafter, assembled pump P (less actuator 5) may be inserted into mounting cup or ferrule 6. As an alternative, lower gasket 7.1 may be inserted into mounting cup or ferrule 6 after insertion of assembled pump P into mounting cup or ferrule 6. Pump P is inserted so that the pump stem 2.4 of piston 2 fits through opening O, and the flange 80 is snapped into the space between axially-outer 71 and axially-inner 72 steps. This snap fit prevents the need for any crimping of mounting cup or ferrule 6 to pump P. Axially-outer step 71 prevents the top of housing 1 from contacting and compressing upper gasket or diaphragm 7.2. The snap-in fit of pump P housing 1 on mounting cup or ferrule 6 ensures that the pump 1 and mounting cup or ferrule 6 can be securely assembled together as a unit without the need for crimping or other such steps requiring deformation of mounting cup or ferrule 6. The speed of such assembly, therefore, can be greatly increased. After actuator 5 has been mounted on pump P, the entire assembly may be placed on the neck N of container C, and thereafter crimped or otherwise secured to neck N.

In operation, depression of actuator 5 will cause the piston 3 to move downwardly. Such downward movement will draw a step S on piston 3 away from upper gasket or diaphragm 7.2. This movement creates a gap which produces a vent path V between the piston 3 and the upper gasket or diaphragm 7.1, allowing air to enter into the interior of container C along vent path V (which passes between piston 3 and upper gasket or diaphragm 7.2, through slots 81 in flange 80, between axially-outer section 6.2 and larger diameter section 1.1, and through notches 90) to thereby vent the interior of the container C. Axially-inner 72 step will prevent any downward force on actuator 5 from moving pump P relative to mounting cup or ferrule 6. As is known in the art, downward movement of piston 2 will pressurize any liquid in pump chamber 13 until the point where the pressure overcomes the force of spring 22, thereby moving valve stem 8 downward and allowing the passage of pressurized liquid to nozzle 4. Upon release of force on actuator 5, spring 22 will push piston 2 upwardly, drawing liquid into pump chamber 13 through seal 12, until step S contacts upper gasket 7.2. The contact between upper gasket or diaphragm 7.2 and step S seals off vent path V, preventing liquid from leaking through vent path V.

Of course, it will be recognized by those skilled in the art that a variety of variations may be made in the construction of the above invention without departing from the claims. As such, the scope of the above invention is to be limited only by the claims appended hereto.

What is claimed is:

1. An assembly for mounting on a container, the assembly comprising:

a pump, the pump comprising a housing, the housing comprising an axially outer surface; and a securing device, the securing device surrounding the pump when assembled to the pump, the securing device comprising a top, the securing device further comprising a radially-inwardly projecting first step, the first step being axially-inwardly spaced from the top, contact between the first step and the axially outer surface of the housing preventing movement of the pump housing toward the top.

2. The assembly of claim 1, wherein:

the housing comprises a radially outer surface, the housing further comprising, on the radially outer surface, at least one radial projection, the radial projection comprising the axially outer surface.

3. The assembly of claim 1, further comprising:

a gasket, the gasket being located between the axially outer surface and the top.

4. The assembly of claim 3, wherein:

the gasket has a thickness, the thickness being less than or equal to a distance between the first step and the top.

5. The assembly of claim 2, wherein:

the at least one radial projection comprises a flange.

6. The assembly of claim 5, wherein:

the flange comprises at least one axial slot.

7. The assembly of claim 2, wherein:

the securing device further comprises a radially-inwardly projecting second step, the second step being axially-inwardly spaced from the first step.

8. The assembly of claim 7, wherein:

the radial projection comprises an axially inner surface, contact between the second step and the axially inner surface of the radial projection preventing movement of the pump housing away from the top.

9. The assembly of claim 8, wherein:

the radial projection snaps into a space between the first and second steps.

10. The assembly of claim 2, wherein:

the radial projection comprises an axially inner surface.

11. The assembly of claim 1, wherein:

the housing comprises a larger diameter section and a smaller diameter section.

12. The assembly of claim 11, wherein:

the pump comprises a piston, the piston comprising a larger diameter section sliding in the larger diameter section of the housing, the piston further comprising a smaller diameter section.

13. The assembly of claim 12, wherein:

the smaller diameter section of the piston comprises at least one slot.

14. The assembly of claim 11, wherein:

the axially outer surface is located on the larger diameter section of the housing.

15. The assembly of claim 11, wherein:

the securing device comprises a larger diameter section and a smaller diameter section.

16. The assembly of claim 15, wherein:

the first step is located on the smaller diameter section of the securing device.

17. A method of securing a pump, comprising the steps of:

providing a pump comprising a housing having a radially outer surface, the housing comprising on the radially outer surface at least one radial projection, the radial projection comprising axially outer and axially inner surfaces;

providing a securing device comprising a top, a radially-inwardly projecting first step axially-inwardly spaced from the top, and a radially-inwardly projecting second step axially-inwardly spaced from the first step; and snapping the at least one radial projection into a space between the first and second steps.

18. The method of claim 17, wherein:

the at least one radial projection comprises a flange comprising at least one slot, and wherein the step of snapping the at least one radial projection into a space between the first and second steps comprises creating a vent path through the at least one slot.

19. The method of claim 17, further comprising the step of:

inserting a gasket into the securing device between the securing device and the at least one radial projection.

20. The method of claim 19, wherein:

the step of inserting a gasket comprises inserting the gasket against the top.

21. The method of claim 17, further comprising the step of:

securing the assembly to a container.

22. The method of claim 21, wherein:

the step of securing comprises crimping the securing device to the container.

23. The method of claim 17, further comprising the step of:

attaching an actuator to the pump after the step of snapping the at least one radial projection into a space between the first and second steps.

* * * * *